United States Patent
Ma (10) Patent No.: US 10,605,606 B2
(45) Date of Patent: Mar. 31, 2020

(54) VISION-AIDED AERIAL NAVIGATION (71) Applicant: Yunqian Ma, Oak Park, CA (US)

(72) Inventor: Yunqian Ma, Oak Park, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 141 days.

(21) Appl. No.: 16/032,478

(22) Filed: Jul. 11, 2018

(65) Prior Publication Data
US 2018/0328736 A1 Nov. 15, 2018

Related U.S. Application Data (63) Continuation of application No. 15/155,818, filed on May 16, 2016, now Pat. No. 10,054,445.

(51) Int. Cl.
G06K 9/00 (2006.01)
G01C 21/16 (2006.01)
(Continued)

(52) U.S. Cl.
CPC .......... *G01C 21/165* (2013.01); *B64C 39/024* (2013.01); *G01C 21/005* (2013.01); *G06K 9/0063* (2013.01); *G06K 9/342* (2013.01); *G06K 9/6202* (2013.01); *G06K 9/6249* (2013.01); *G06K 9/6268* (2013.01); *G06K 9/6269* (2013.01); *B64C 2201/123* (2013.01);
(Continued)

(58) Field of Classification Search
None
See application file for complete search history.

(56) References Cited

U.S. PATENT DOCUMENTS 6,078,701 A * 6/2000 Hsu .................. G06K 9/32
375/E7.086
7,822,275 B2 10/2010 Rasheed et al.
(Continued)

FOREIGN PATENT DOCUMENTS

WO 00/34803 6/2000

OTHER PUBLICATIONS

Abd-Elrahman, et al.: "Detection of Positional Errors in Systems Utilizing Small-Format Digital Aerial Imagery and Navigation Sensors Using Area-Based Matching Techniques"; Photogrammetric Engineering & Remote Sensing, vol. 67, No. 7, Jul. 2001, pp. 825-831.

Primary Examiner — Shervin K Nakhjavan
(74) Attorney, Agent, or Firm — Tarolli, Sundheim, Covell & Tummino LLP (57) ABSTRACT An aerial vehicle is navigated using hierarchical vision-aided navigation that classifies regions of acquired still image frames as featureless or feature-rich, and thereby avoids expending time and computational resources attempting to extract and match false features from the featureless regions. Pattern recognition registers an acquired image to a general area of a map database before performing feature matching to a finer map region. This hierarchical position determination is more efficient than attempting to ascertain a fine-resolution position without knowledge of coarse-resolution position. Resultant matched feature observations can be data-fused with other sensor data to correct a navigation solution based on GPS and/or IMU data.

20 Claims, 7 Drawing Sheets (51) Int. Cl.
*G06K 9/34* (2006.01)
*G06K 9/62* (2006.01)
*G01C 21/00* (2006.01)
*B64C 39/02* (2006.01)
*B64D 47/08* (2006.01)

(52) U.S. Cl.
CPC .. *B64C 2201/127* (2013.01); *B64C 2201/146* (2013.01); *B64D 47/08* (2013.01)

(56) References Cited

U.S. PATENT DOCUMENTS

| | | |
|---|---|---|
| 8,209,120 B2 | 6/2012 | Breed |
| 8,457,882 B2 | 6/2013 | Pyne et al. |
| 9,002,098 B1 | 4/2015 | Chelian et al. |
| 9,070,216 B2 | 6/2015 | Golparvar-Fard et al. |
| 9,177,481 B2 | 11/2015 | Wang et al. |
| 2008/0243383 A1* | 10/2008 | Lin ................ G08G 5/0078 701/469 |
| 2012/0110019 A1* | 5/2012 | Nielsen ............ G06Q 50/08 707/781 |
| 2014/0369595 A1 | 12/2014 | Pavlidis et al. |
| 2015/0286868 A1* | 10/2015 | Flores ............ G06K 9/00651 382/103 |
| 2016/0292869 A1 | 10/2016 | Hammond et al. |
| 2016/0379388 A1 | 12/2016 | Rasco et al. |
| 2018/0292214 A1* | 10/2018 | Zhang .............. G05D 1/101 |

* cited by examiner

VISION-AIDED AERIAL NAVIGATION

GOVERNMENT INTEREST

This invention was made with government support under contract FA8650-11-C-1045 awarded by the United States Air Force, Air Force Research Laboratory, Wright-Patterson Air Force Base. The government has certain rights in the invention.

RELATED APPLICATIONS

This application claims priority from U.S. patent application Ser. No. 15/155,818, filed 16 May 2016, which is incorporated herein in its entirety.

TECHNICAL FIELD

The present invention relates to navigation systems and more particularly to vision-aided aerial navigation.

BACKGROUND

Satellite navigation (satnav) systems such as the Global Positioning System (GPS) and similar global navigation satellite systems (GNSS) can be used for navigation of aerial craft, including both human crewed and/or remotely piloted and/or autonomous aircraft. Such craft include guided missiles, unmanned aerial vehicles (UAVs) and micro air vehicles (MAVs). Satnav systems can inform a craft equipped with the appropriate receiver and processing apparatus of the craft's precise geographical location in space with respect to the Earth by delivering spatial coordinates which can then be used to navigate the craft, whether by onboard or remote pilots or by autonomous navigation systems. However, satnav systems exhibit less than total reliability, and moreover are occasionally unsuitable for certain navigation applications. Sensor readings from an inertial measurement unit (IMU) may also be used for navigation, but the position solutions from IMU sensor readings tend to drift over time and thus pose accuracy problems of their own. In view of the challenges presented by GPS- and IMU-based navigation, aerial vehicles may rely on alternate methods of navigation, including methods that estimate spatial position based on visual indicators. Spatial position may be estimated, for example, by matching features extracted from image frames representing aerial observations taken at different times (e.g., two consecutive frames), thus showing a relative change in spatial position between the two image acquisition times. Another way of estimating spatial position may be by comparing extracted features to features extracted from observations stored in a database, or to such features stored in a database, which images or features are "geo-registered" such that the spatial coordinates of the database images or features are known.

Vision-based or vision-aided navigation is difficult or impossible, however, where appropriate visual indicators are nonexistent or spurious. While an aerial vehicle traveling over well-charted urban terrain, for example, may be able to visually estimate spatial position by recognizing such landmark features as streets and buildings, an airborne craft traveling over water or desert may not be able to accurately estimate position from spurious visual features. These spurious visual features are referred to herein as "false features." Examples of false features include wave crests on water or sand dune shapes on land. Such features are "false," and do not aid aerial navigation, when they are ephemeral and cannot correspond to known positions. As such, false features can be likened to noise that should not be confused for useful signal. Images or image portions showing densely forested areas, grassland, tundra, glacial fields, and other types of terrain can similarly present false features that mislead or stymy efforts at vision-aided navigation, as can images or image portions that include the sky and clouds. A vision-aided positioning system can expend extensive computational resources in futile attempts to find false features and/or to match false feature configurations to known true feature topographies.

SUMMARY

In one example, there is provided a method of navigating an aerial vehicle comprising acquiring an aerial image frame from a camera on the aerial vehicle, partitioning the acquired aerial image frame into a plurality of regions, classifying one or more of the plurality of regions as featureless or feature-rich at least in part by computing a texture metric of the region, extracting features for those regions classified as feature-rich and not for those regions classified as featureless, and navigating the aerial vehicle based at least in part on the extracted features. The texture metric may be computed, for example, by computing an autocorrelation function of the image region and determining at least one peak width. The at least one peak width may then be tested against a threshold to classify the region as featureless or feature-rich.

In another example, there is provided a system for navigating an aerial vehicle comprising a camera configured to acquire an aerial image frame, an image processor, and navigation controls configured to navigate the aerial vehicle based at least in part on the extracted features. The image processor may comprise a partitioner configured to partition an acquired aerial image frame into a plurality of regions, a classifier configured to classify one or more of the plurality of regions as featureless or feature-rich, and a feature extractor configured to extract features only for those regions classified as feature-rich and not for those regions classified as featureless. The classifier may classify the one or more of the plurality of regions as featureless or feature-rich by computing a texture metric. An example of an appropriate texture metric computation would be computing an autocorrelation function to determine at least one peak width and testing the at least one peak width against a threshold.

In yet another example, there is provided a method of navigating an aerial vehicle comprising acquiring an aerial image frame from a camera on the aerial vehicle, partitioning the acquired aerial image frame into regions, classifying one or more regions as featureless or feature-rich, extracting features for those regions classified as feature-rich and not for those regions classified as featureless, and navigating the aerial vehicle based at least in part on the extracted features. The classifying one or more regions as featureless or feature-rich may be done by using a model that has been trained using a machine learning method applied to a training dataset comprising a plurality of training images of featureless regions and a plurality of training images of feature-rich regions. The machine learning method may use a support vector machine. The model may be trained using a machine-learning method applied to features extracted from the training images prior to acquiring the aerial image frame.

DETAILED DESCRIPTION

In view of the problems associated with long aerial journeys over featureless regions and of false features hindering vision-based aerial navigation, the present application presents aerial navigation systems and methods that are capable of distinguishing images or image portions having false features from those having true features, i.e., features helpful in determining a geographical position, so as to prune featureless regions from computationally expensive feature extraction and feature matching. These systems and methods thereby provide more efficient vision-aided navigation of aerial craft, including missiles and drones.

Integrating inertial measurement unit (IMU) sensors and camera sensors can provide aerial vehicles GPS-like navigation performance in GPS-denied environments, or can improve upon the accuracy of GPS-based navigation, particularly during flight over visual feature-rich urban areas. In the airspace above urban environments, point features from buildings, roads, and other landmarks, are sufficient to be matched to like features derived from an existing map database. A navigation solution can be formed using the matched features, and the navigation solution can be input into flight controls to guide the aerial vehicle to an intended new position. However, when an aerial vehicle flies over water for some time, or more generally, over any area lacking such matchable features, the vehicle's vision-aided navigation system can fail to ascertain its true geographic position, rendering impossible the navigation toward a target position or destination. Moreover, the vision-aided navigation system can become confused or hobbled by false features detected from such ephemeral or unmapped landscape features as, for example, waves, ripples, dunes, trees, grasses, glaciers, ice floes, rocks, pebbles, cracks, and clouds.

A common scenario involves an aerial vehicle flying over water for an extended period of time, encountering a shoreline, and then flying inland over an urban area. The systems and methods disclosed herein particularly address the "over-water-region" problem, or more generally the problem described above wherein an aerial vehicle making use of vision-aided navigation flies for some period of time over featureless regions. By "featureless," it is meant that aerial imagery of the region provides no true features or too few true features to provide accurate matching to known feature topographies; as such, a region may be featureless even if it contains numerous false features, or even a few true features. "Over-water" regions in particular have few features or many false features.

A craft need not be entirely GPS-denied (or, more generally, GNSS-denied) to benefit from vision-aided navigation. The systems and methods described herein can also be beneficial in removing jitter in the calculated position due to GPS uncertainty and/or IMU drift. Because the navigation system described makes no assumptions about the availability or quality of GPS, it therefore can operate under GPS-denied, degraded GPS, or partial GPS constellation conditions.

Figure 1:
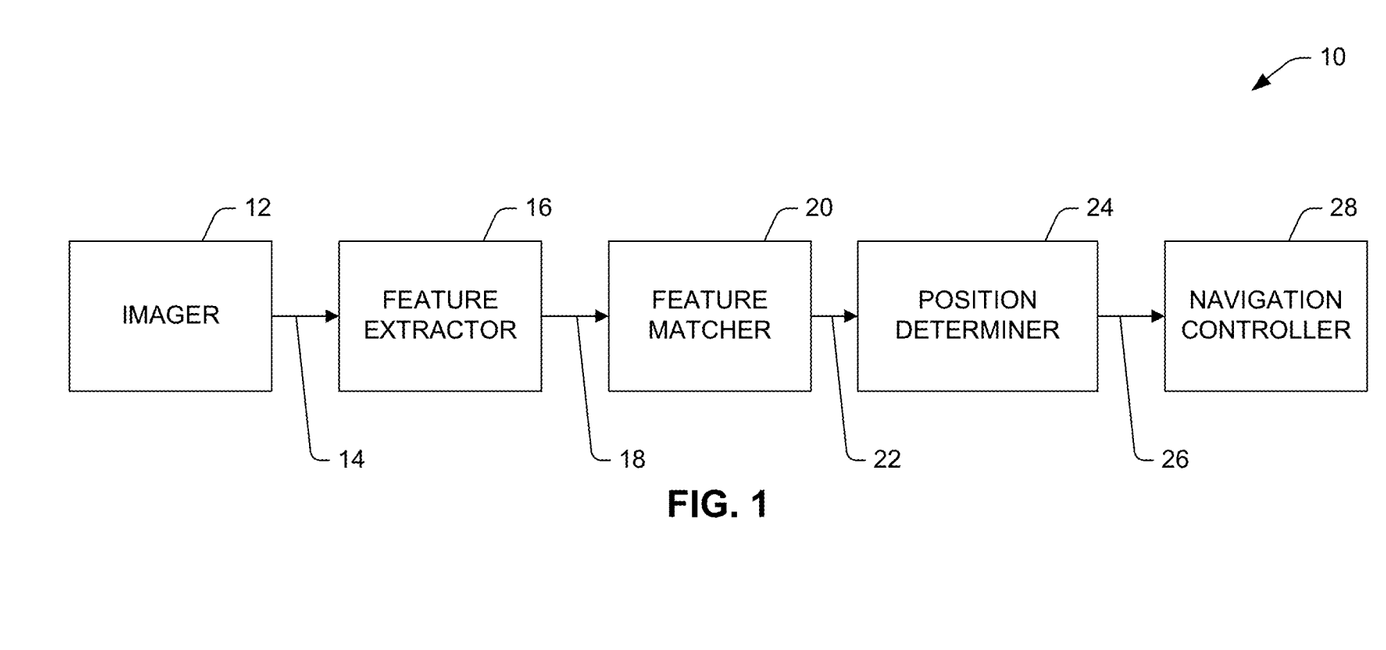
FIG. 1 illustrates an example of a system for vision-aided navigation.

FIG. 1 depicts a system for vision-aided navigation 10. First, imager 12 performs image acquisition. For example, imager 12 may be an onboard camera that acquire an aerial image that at least partially includes the Earth surface area below an aerial vehicle. The camera can be of any type capable of resolving the features of interest. For example, the camera may comprise a passive electro-optical (EO) sensor or an electro-optical/infrared (EO/IR) sensor, for example having a resolution of at least 16 megapixels. Imager may pass the acquired image on to subsequent components as digital image data 14 and thus may include the requisite digital image circuitry for sampling, pre-processing and transmitting the digital data.

Next, feature extractor 16 receives the image data 14 and extracts features 18 from the acquired image. The features extracted can be low-level features such as edges, corners, blobs, and ridges, or they can be higher-level features such as buildings and other structures, streets, rivers, lakes, or other geographical landmarks.

A subsequent feature matcher 20 matches the extracted features 18 to known features stored in a map database, or extracted from images stored in a map database. The database features or database images are stored along with and associated with spatial coordinates in the database, i.e., the database features or database images are geo-referenced. The feature matcher 20 thus performs geo-registration by determining spatial correspondences between the acquired aerial imagery 14 and previously stored geo-referenced data.

Given a resultant match 22, position determiner 24 calculates, estimates or predicts the most probable geographical location of the acquired image 14, and, taking into account camera calibration information, thus the most probable geographical position 26 of the aerial vehicle that acquired the image 14. The position determiner 24 may make use of a form of data fusion, incorporating information from optional other sensors (not shown) to more accurately ascertain position. These other sensors can include one or more of IMU sensors, GPS sensors, barometric sensors. The data fusion can be performed, for example, using an extended Kalman filter.

The geographic position 26 of the aerial vehicle can be provided to navigation controller 28 which can actuate flight controls such as control surfaces and propulsion systems (not shown) to guide the aerial vehicle to a target position or destination, which can include causing the craft to circle, loiter, land, dive, climb, bank, reverse direction, speed up, slow down, etc. Target position or destination may have been provided prior to the flight, or may be transmitted to the aerial vehicle or determined by the aerial vehicle at any time during flight.

Because efficiency is important for real-time geo-registration to be effective for vision-aided navigation, the above-described sequence may take less than 10 seconds. For example, it may take less than 1 second. For example, it may take less than 0.1 seconds. Under typical parameter settings and using presently available hardware, 1,000 features can be extracted from an aerial image of an urban area in about 3 seconds. However, if the aerial vehicle travels over water or another featureless region to later venture inland, under the same parameter settings, a single-thread process may extract 20,000 false features from the water or other featureless region of an acquired aerial image.

Three related problems result from the detection of numerous false features. First, it may cost about five minutes to extract those 20,000 false features from the water region. By the time feature extraction is finished, the data may be too stale to be useful for data fusion, because normally the Kalman filter or other data fusion process can only wait for up to about ten seconds to receive vision-based features for fusing with IMU data and other data. In this way, attempts to extract false features can delay the provision of matched features to position determiner 24 beyond their usefulness and can significantly hobble the overall system 10. Second, the time expended in the attempted extraction of false features can prevent the system from starting to process the next acquired image frame in a single-thread process. Third, any false features that are erroneously matched to real-world features will tend to confuse the system 10 and can misdirect navigation. For these reasons, the vision-aided navigation system 10 can be equipped with a way to detect featureless regions and thus to avoid attempting to extract or to match false features from featureless regions.

Figure 2:
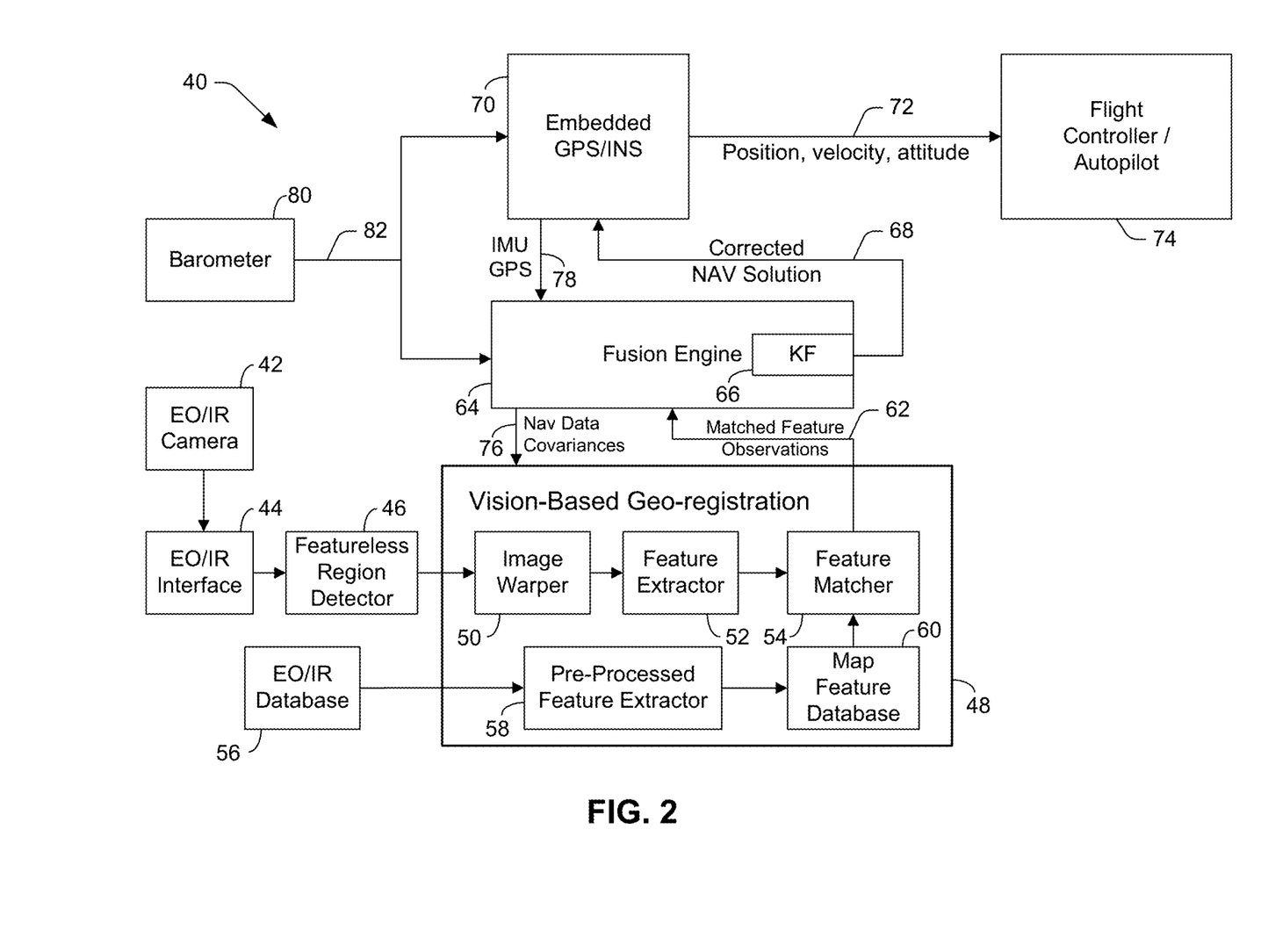
FIG. 2 illustrates an example of a system for vision-aided navigation using featureless region detection.

FIG. 2 shows an example of a vision aided navigation system 40 that includes featureless region detection. Featureless region detector 46 can accept the output of an image acquisition subsystem comprising camera 42 and interface 44. As noted above, camera 42 may be an EO/IR camera. Featureless region detector 46 can segment the acquired image into regions and can pass only those regions having true features, or only those regions substantially lacking false features, on to vision-based geo-registration system 48 for feature extraction by feature extractor 52 and feature matching by feature matcher 54, thus greatly improving the performance of the geo-registration system 48 as well as the overall navigation system 40. As such, featureless region detector 46 can be thought of as a filter that does not permit featureless regions to pass on to computationally expensive and/or time-consuming parts of the geo-registration process. Vision-based geo-registration system 48 may also include pre-processing such as image warping performed by image warper 50, which provides ortho-rectification to remove perspective distortion of camera-captured image frame regions by, for example, applying a homography matrix to transform the perspective camera view to a bird's-eye view. Other pre-processing might include histogram equalization, resampling, noise removal, and/or other methods of appropriately readying the acquired image frame regions for feature extraction by feature extractor 52 and feature matching by feature matcher 54.

Vision-based geo-registration system 48 can also be provided with a database 56 of geo-referenced aerial or satellite imagery or maps having features with known correspondences to geospatial coordinates. Such features can be extracted by pre-processing feature extractor 58 to generate map feature database 60 against which acquired-image features extracted by feature extractor 52 are compared by feature matcher 54. Database 56 can be stored in an onboard memory, or the appropriate portions of the database 56 can be transmitted to the aerial vehicle at the appropriate times. For example, if the database is too large to store in memory, but the calculated, estimate, or predicted position of the aerial vehicle is over, for example, a particular state or territory, the portion of the database corresponding only to the geospatial area of or near the state or territory can be transmitted. Then, later, when the aerial vehicle's calculated, estimated, or predicted position changes to a different state or territory, the aerial vehicle can transmit a message requesting the corresponding portion of the database 56 and thus receive an updated database 56.

Feature matcher 54 can proceed by, for example, finding a least squares estimation for correspondences between feature points generated for each of the acquired image features (as extracted by feature extractor 52) and the geo-referenced image features (as provided by map feature database 60). Feature matcher 54 thus can produce matched feature observations 62 which can either be provided directly to a flight controller or autopilot 74 or are used to correct a navigation solution computed using one or both of inertial measurements and satnav estimates. In the illustrated case, the correction is made via a fusion engine 64 that can include, for example, a Kalman filter 66, for example an extended Kalman filter. The fusion engine 64 accepts data 78 from an IMU and/or GPS, which may be provided, for example, by an embedded GPS/INS system 70. The fusion engine 64 may also be provided with barometer data 82 from a barometric sensor 80 which can provide an estimate of elevation. The fusion engine 64 fuses the various input measurements, including the matched feature observations 62, to produce a corrected navigation solution 68.

The corrected navigation solution 68 can then be provided to a system with outputs for flight controls and/or avionics, represented in FIG. 2 by embedded GPS/INS 70 and flight controller or autopilot 74. The GPS/INS system can supply navigation signals 72 (e.g., calculations, estimations, or predictions of position, velocity, and/or attitude) to serve as inputs to flight controller or autopilot 74 which can effect actuation of control surfaces, propulsion, braking systems, etc., to navigate the aerial vehicle.

The fusion engine 64 can supply navigation data and navigation solution covariances 76 to vision-based geo-registration system 48 and/or to other sensors (not shown). This feedback information 76 supplied to the vision-based geo-registration system 48 can aid the vision-based geo-registration system 48 in understanding the approximate location of the aerial vehicle and thus helps narrow the feature matching search performed by feature matching 54 to a particular geographic area. For example, feedback information 76 can include approximate location coordinates as well as covariance information that in effect represents a distance error value indicative of the geographic circle to which the feature matching search should at least initially be limited. If, for example, this feedback information 76 indicates that the most likely position of the aerial vehicle is within one hundred miles of San Francisco, Calif., feature matcher 54 will be spared the computational expense and time required to test acquired-image region extracted features against database features from areas in Europe, India, etc. Instead, feature matcher 54 will first test acquired-image region extracted features against database features geo-registered as being within one hundred miles of San Francisco.

Navigation data, covariances, and corrected navigation solutions can also be transmitted to a home base or remote pilot. The home base or remote pilot can transmit navigation instructions, or map database images or features, to the aerial craft. Such transmission can be accomplished, for example, by RF transmission, microwave, or infrared, and such transmission may be direct or may be relayed, for example, by satellite.

In a system for aerial navigation 40 in accordance with one example, the classifier 46 is configured to classify the regions in parallel, with each region classified in an independent software thread. The system may further comprise a feature matcher 54 configured to generate matched feature observations 62 by matching features extracted from the regions by the feature extractor 52 to corresponding features in a map feature database 60. The system may also comprise a data fusion engine 64 configured to generate a corrected navigation solution 68 by combining the matched feature observations 62 with one or more of inertial measurement unit (IMU) sensor readings 78, global positioning system (GPS) sensor readings 78, and/or barometric sensor readings 82 using a Kalman filter 66, the corrected navigation solution 68 suitable for input into an inertial navigation system (INS) 70. The classifier 46 may dynamically compute a class-distinguishing threshold, for example, as an Otsu threshold statistically derived from a set of peak widths determined from the plurality of regions, the set of peak widths having a bimodal distribution.

FIGS. 3-7 illustrate the functioning of featureless region detector 46 according to either of two classification schemes. Either classification scheme can first involve image segmentation. For example, in FIG. 3, acquired image frame 100 has been segmented into regions. While the segmentation illustrated has been performed using a grid partition method, a watershed segmentation method or any other suitable segmentation method may be used. While the grid used here is 5-by-5, to produce 25 regions of equal size, other size grids producing regions of equal or unequal size may be appropriate under other circumstances, taking into consideration the resolution of the sensor with which the image frame has been acquired, the field of view of the camera, the angle of elevation of the camera, the distance from the ground plane, and other factors.

Where grid partitioning is used, the primary considerations of choice of grid size are, first, to generate grid regions of sufficiently small size such that at least some featureless portion(s) of the image will be partitioned out into one or more regions, and second, to generate grid regions large enough so as to encompass enough features for feature-rich partition regions to result in useful matches to features extracted from geo-registered images. A third consideration for grid size choice may be the preference for encompassing, in partitioned feature-rich regions, not so many features that computational times for a single region become excessive, as defined, for example, by a timeout threshold. As such, an adaptive grid sizing scheme can be implemented using, for example, Pareto multi-objective optimization, to achieve suitable or optimal grid sizes, and in such case, the scheme may be informed with data values specifying one or more of the above-mentioned resolution, field of view, and distance metrics, and may also be informed with feedback as to extraction and matching processing times for regions classified as feature-rich. If all regions in an image frame are classified as feature-rich and all are processed for feature extraction and matching within acceptable time limits (e.g., under 10 seconds), then the size of the partition grid is not critically limiting and may stay or be reset to a default size (e.g., 5-by-5).

The objective of the featureless region detection as performed by featureless region detector 46 is to classify each region as featureless or feature-rich. The classification can be binary, with each region being classified as one or the other. Alternatively, in some instances the classification can rank the regions by likelihood of being featureless. In the binary sorting case, those regions classified as featureless will not be passed on for feature extraction and feature matching. In the probability ranking case, those regions ranked lowest, i.e., as least probably featureless, will be passed on for extraction and matching with high priority as dictated by the assigned ranking, while higher-ranked featureless regions, assigned low priorities, will only be processed for feature extraction and feature matching after all higher-priority regions have already been processed. Resultantly, lowest-priority regions (i.e., those regions highest-ranked in terms of probability of being featureless) may not be extraction- and matching-processed at all if higher-ranked regions have consumed available computational or time resources as determined by predefined or adaptive thresholds.

For example, in the probability ranking case, lower-ranked regions may be processed for feature extraction and feature matching in order up until the expiry of a ten-second period, at which point no further regions in the frame (i.e., those ranked higher as probably featureless) will be processed for feature extraction and feature matching. The ten-second threshold for region processing may be adaptively adjusted as more or less computational resources become available for region feature extraction and feature matching.

It will be appreciated that in practice, not all regions in an image frame will always need to be feature-processed in order to generate an accurate and useful position result; often, an accurate position solution can result from the matching of just a few of the segmented regions of an image frame. Where processing of additional, potentially lower-ranked regions does not improve the assessed accuracy of the position determination, as ascertained by a diminishing marginal returns determination, remaining unprocessed regions may be discarded in favor of moving on to processing of a subsequent image frame captured later in time which is thus more indicative of the aerial vehicle's most recent position.

Whether the categorization made is binary or graduated, the system can benefit from the preliminary pruning of those featureless regions that cannot or should not be processed for feature extraction and matching, or in the case of the ranking assessment, should be given least preferential feature extraction/matching processing treatment.

Two schemes for classifying regions as featureless or feature-rich are presented. In the first scheme, a texture computation of a region is performed by, for example, computing the autocorrelation function of the region. In the second scheme, a machine learning method is used to discriminate between featureless and feature-rich regions.

Figure 3:
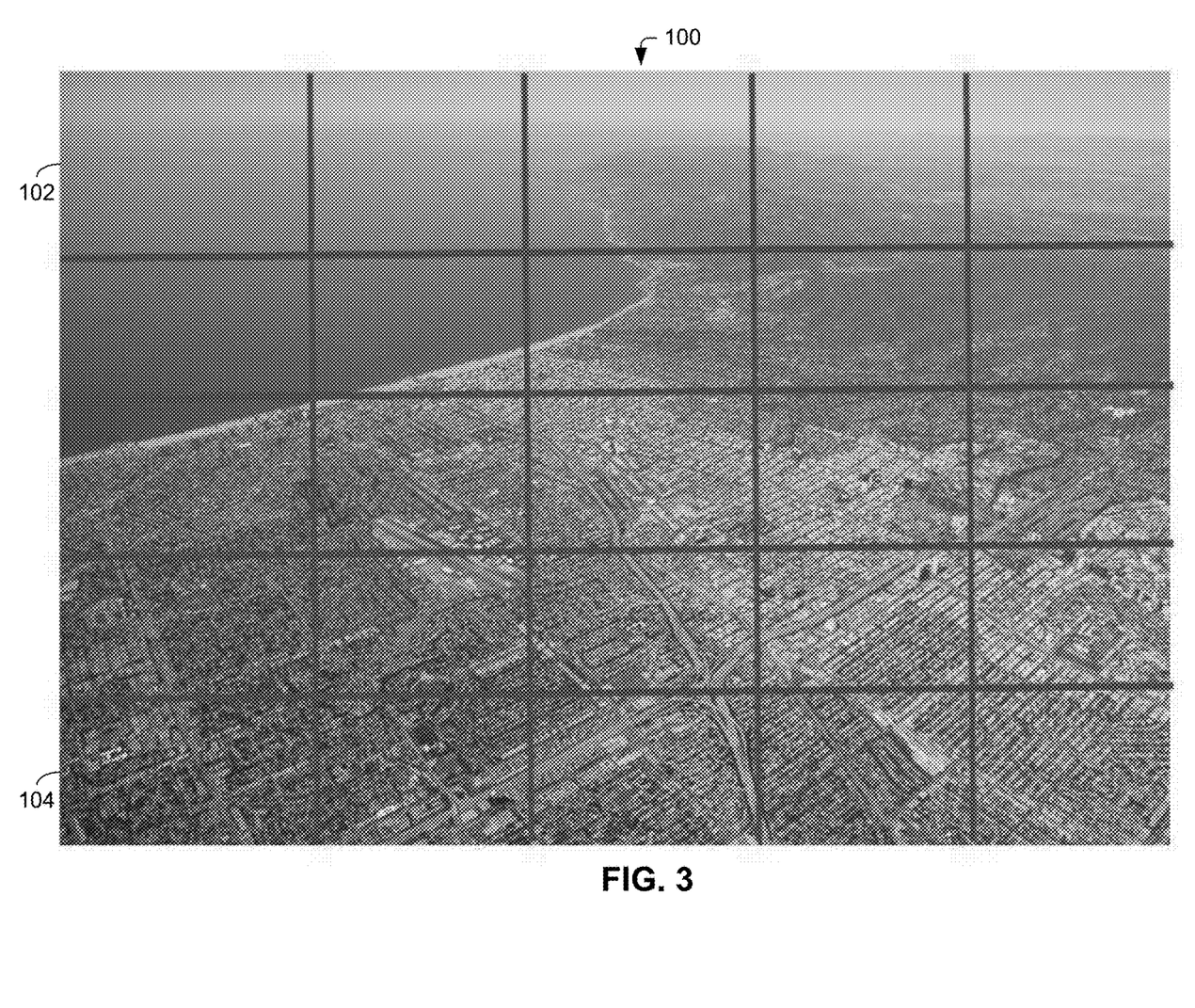
FIG. 3 illustrates an example of an acquired aerial image segmented into regions using a 5-by-5 grid partition.
Figure 4:
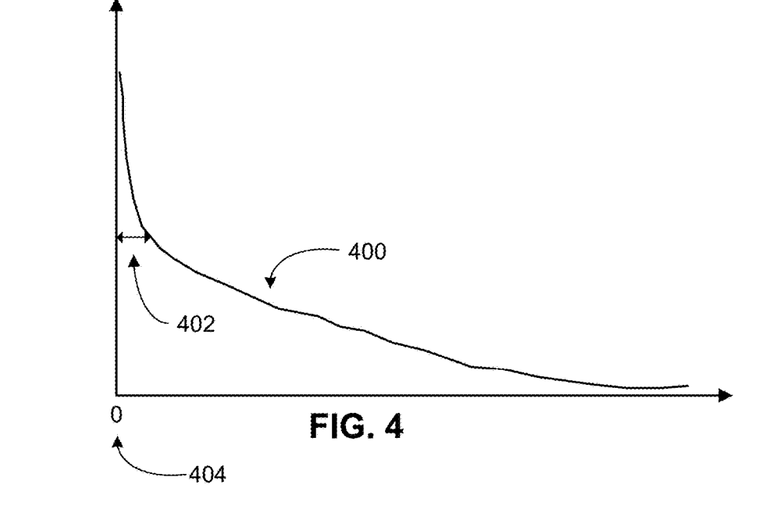
FIG. 4 illustrates an example of an autocorrelation function computed for a region.

In the texture computation-based region classification scheme, featureless region 102 can be classified as such and thus distinguished from feature-rich region 104 by computing a metric indicative of flatness of texture. For example, the metric may be an autocorrelation peak width. In such an example, the steps are as follows. First, the autocorrelation function of a region is computed. FIG. 4 shows an example of an autocorrelation function 400 computed from an image region. Next is calculated an autocorrelation function peak width 402. In practice, the height at which the width 402 is taken is empirically determined. As examples, the width 402 of the peak may be taken as the full width at half maximum (FWHM) or as the $1/e^2$ width. In the illustrated example, the width for the peak near zero on the x-axis 404 in the function shown in FIG. 4 is calculated, and the same may be done for the autocorrelation functions computed from each of the other segmented regions in the acquired image frame 100. Thus, for each of the twenty-five segmented regions in the image frame 100 shown in FIG. 3, the resultant array of peak widths is arrived at:

| 89 | 107 | 92 | 60 | 50 |
|----|-----|----|----|----|
| 72 | 60  | 5  | 4  | 6  |
| 6  | 5   | 4  | 4  | 5  |
| 4  | 4   | 4  | 4  | 5  |
| 5  | 4   | 4  | 4  | 4  |

Higher computed values (wider autocorrelation peaks widths) correspond to flatness of texture and thus to featureless regions in FIG. 3, such as region 102 showing water and sky. Next, the computed autocorrelation peak width values can be compared to a threshold. In the present example, a value of 10 can serve as a good threshold, as can be noted by comparing the values in the above array with the corresponding regions in FIG. 3. In practice, the threshold can be predefined or can be dynamically computed, for example, as an Otsu threshold statistically derived for the set of computed autocorrelation peak widths for a plurality of regions.

In the above example, it is noted that the peak widths have a bimodal distribution with most or all of the peak widths for the land-area image regions being computed at values between 4 and 6, while the featureless image regions containing predominantly water, sky, or land too distant or obscured by haze to supply useful landmark features generate autocorrelation peak widths having values more than 50. An Otsu threshold can thus be chosen that well divides the two modes of the distribution. The above classification scheme is thus capable of discriminating between featureless regions and feature-rich regions based on comparing the width of the peaks with the chosen threshold. Alternatively, as discussed above, the regions can be ranked by autocorrelation peak width, with lower peak width value image regions being selected for priority processing for feature extraction and feature matching, and the higher peak width value image regions being discarded as unprocessable within a time threshold, the system having already moved on to processing a subsequently acquired image frame.

Figure 8:
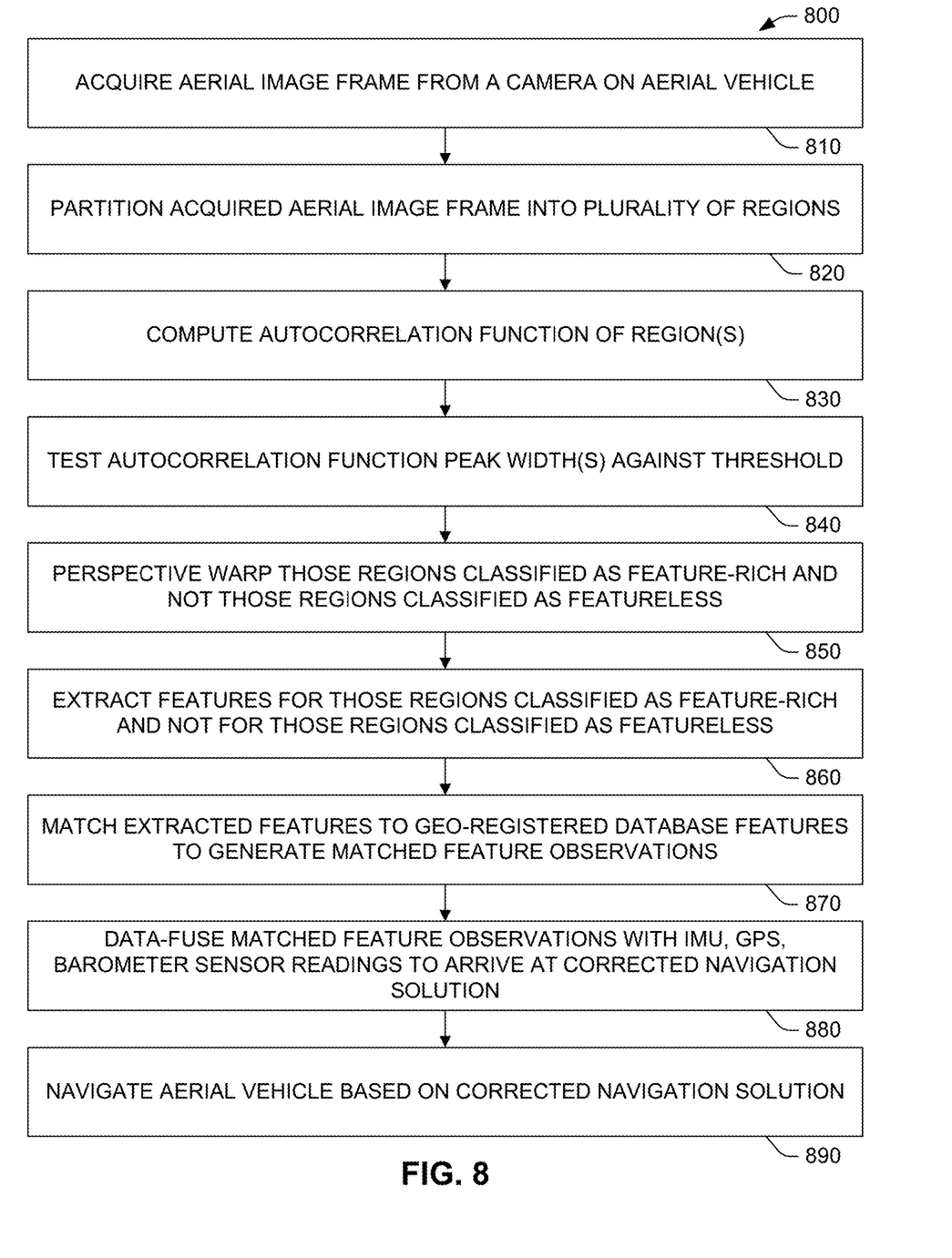
FIG. 8 is a flow chart illustrating an aerial vehicle navigation method using an autocorrelation-based region classification scheme.

A method of aerial vehicle navigation 800 according to the autocorrelation-based region classification scheme is illustrated in the flow chart of FIG. 8, with 810-890 corresponding to the sequence described above, and classification 830-840 in particular corresponding to the autocorrelation-based classification scheme.

The threshold against which the autocorrelation function peak width is tested in 840 may be dynamically computed, for example, as an Otsu threshold statistically derived from a set of peak widths determined from the plurality of regions, the set of peak widths having a bimodal distribution. Alternatively, the regions of an image frame may be ranked by likelihood of being featureless using the computed texture metric as the ranking metric. The classifying of the regions may be conducted in parallel, with each region classified in an independent software thread. After the extracting features 860 and prior to the navigating the aerial vehicle 890, the features may be matched 870, wherein matched feature observations may be generated by matching features extracted from the regions in the feature extraction step to corresponding geo-registered features in a map feature database.

After the classifying 830, 840 and prior to the extracting features 860, perspective warping 850 may be performed, wherein the perspective of a region is ortho-rectified. The partitioning the acquired aerial image frame 820 may comprise partitioning the acquired aerial image frame into regions using, for example, a watershed segmentation method and/or a grid partition method. After the matching features 870 and prior to the navigating the aerial vehicle 890, data fusion 880 may be performed, wherein the matched feature observations are combined with one or more of IMU sensor readings, GPS sensor readings, and/or barometric sensor readings using a Kalman filter to arrive at a corrected navigation solution suitable for input into an inertial navigation system (INS).

Autocorrelation peak width is but one way of determining the texture flatness of a region, and that other methods may similarly be used to compute metrics of texture flatness and thus to rank or classify the regions as featureless or feature-rich. As examples, a edge detection methods, methods involving co-occurrence matrices, and methods using Laws' texture energy measures may be employed.

Figure 5:
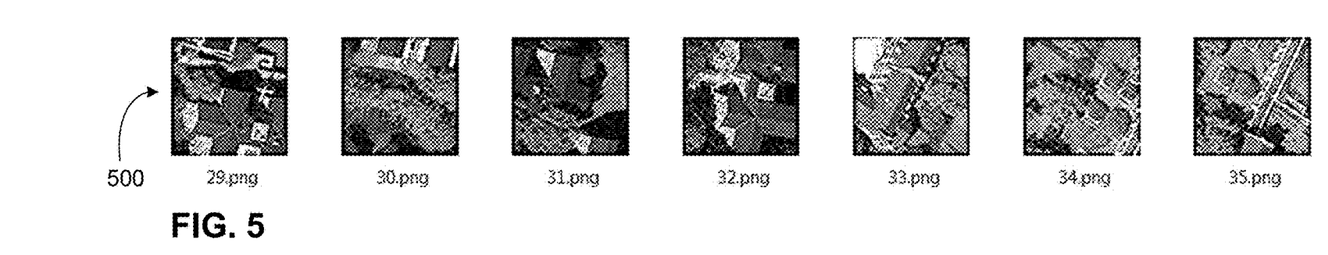
FIG. 5 shows example dataset images for urban (feature-rich) regions used in a machine learning classification scheme.
Figure 6:
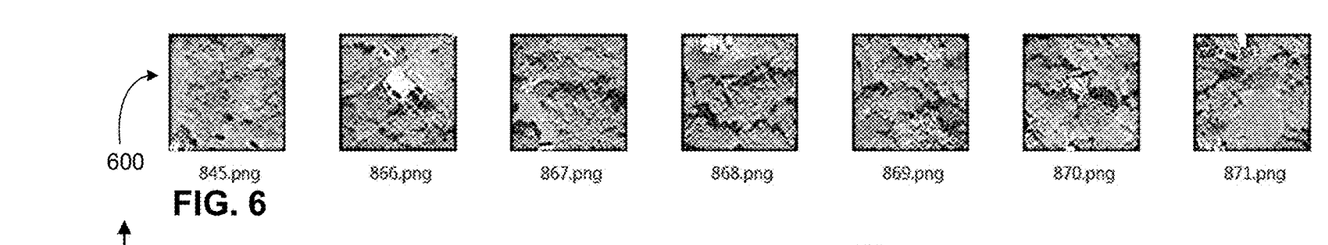
FIG. 6 shows example dataset images for non-urban (featureless) regions used in a machine learning classification scheme.

A second, machine learning-based classification scheme for discriminating featureless regions from feature-rich regions involves two phases, a training phase and a testing phase. During the training phase, a training dataset is provided comprising a plurality of featureless region images and a plurality of feature-rich region images. For example, several hundred images may be provided in each training set. FIG. 5 shows an example set of seven feature-rich (urban) regions 500 while FIG. 6 shows an example set of seven featureless (non-urban) regions 600.

Figure 7:
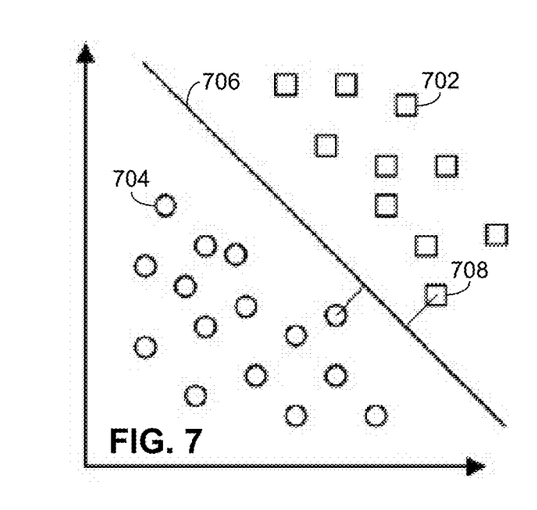
FIG. 7 shows an example classification space, with classified regions separated by a hyperplane, used in a support vector machine-based classification scheme.

Then, a machine learning method, such as one using a support vector machine (SVM), is used to train a model (e.g., a two-class classifier). FIG. 7 shows an example SVM classification, where training dataset examples 702, 704 are mapped to a space and separated by a hyperplane 706 (or set of hyperplanes, not shown), which defines the classification distinction. A hyperplane may be chosen, for example, as one that creates the largest separation, or margin, between two classes. Feature extraction may first be performed on the raw images in the training dataset, and the machine learning method may be applied on top of those features. The extracted features may supply the basis for the vectors used by the SVM to position each training image into the space. The training phase of the machine learning method may be performed at any time. For example, the training phase may be performed prior to the flight of the aerial vehicle to be navigated.

During the testing phase of the machine learning-based classification scheme, the trained model created during the training phase is applied to the image regions segmented from acquired aerial images. In the SVM example shown in FIG. 7, an image region presented to the model for classification 708 is mapped into the space and is classified according to the hyperplane 706 (or hyperplanes) separating the space. The trained model thus can classify featureless (e.g., water) regions and feature-rich (e.g., non-water) regions. The classified featureless regions are then pruned or de-prioritized from further feature extraction and matching processing as described above.

Figure 9:
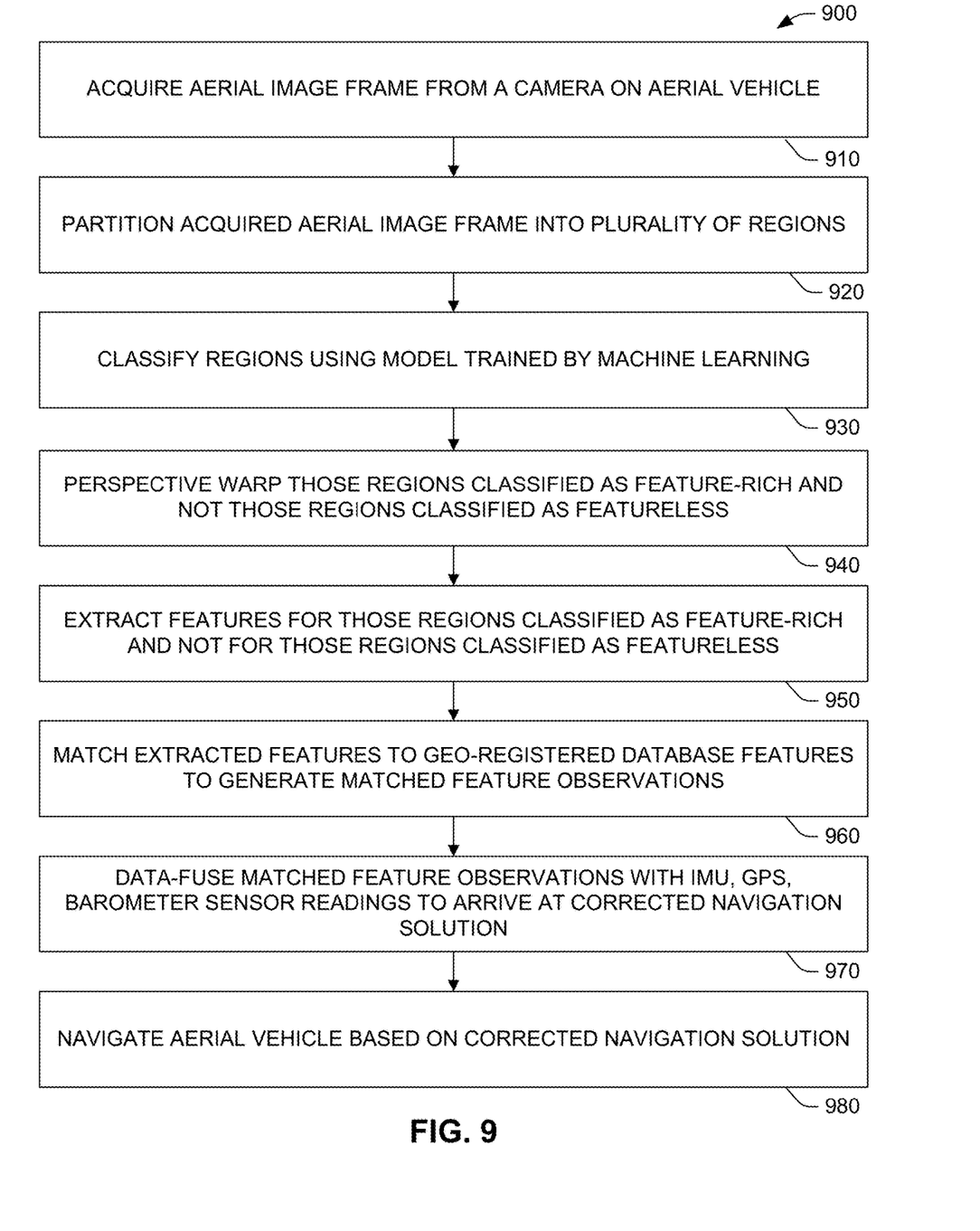
FIG. 9 is a flow chart illustrating an aerial vehicle navigation method using an machine learning-based region classification scheme.

A method of aerial vehicle navigation 900 according to the machine learning model-based region classification scheme is illustrated in the flow chart of FIG. 9, with 910-980 corresponding to the sequence described above, and classification 930 in particular corresponding to the machine learning model classification scheme.

The method 900 may further comprise, after the extracting features 950 and prior to the navigating the aerial vehicle 980, matching features 960, wherein matched feature observations are generated by matching features extracted from the regions in feature extraction 950 to corresponding features in a map feature database. After the matching features 960 and prior to the navigating the aerial vehicle 980, data fusion may 970 be performed, wherein the matched feature observations are combined with one or more of inertial measurement unit (IMU) sensor readings, global positioning system (GPS) sensor readings, and/or barometric sensor readings using a Kalman filter to arrive at a corrected navigation solution suitable for input into an inertial navigation system (INS).

An aerial vehicle employing the vision-aided navigation systems and methods described herein can use either or both of the above classification schemes. Where both schemes are employed to prune featureless regions, the vision-aided navigation system may be configured to prune either a union or an intersection of regions classified as featureless by the two schemes. Alternatively, the system may be configured to first attempt one classification scheme and then attempt the other classification scheme only when the first classification scheme fails. Such failure may occur, for example, where an acquired image has too much random noise to provide a useful autocorrelation analysis but still provides useful results when processed using a machine learning-based scheme.

It will be appreciated that, whatever classification scheme used, pruned image regions not only need not be processed for feature extraction and matching, but also need not be processed for any other pre-processing that would precede the feature extraction and matching, such as perspective warping, noise filtering, etc. In this way, the pruning of featureless images conserves time and processing resources and improves the vision-aided navigation.

The individual regions may be processed in parallel for the relevant computational tasks, including, for example, the autocorrelation function computation or the SVM classification, the image warping, the feature extraction, and the feature matching. The apparatus for performing the processing may be implemented in hardware, firmware and/or software.

For example, in the case of an image processor comprising a partitioner, a classifier, a feature extractor, and/or a feature matcher, each of the partitioner, classifier, feature extractor, and feature matcher may consist of electronic hardware components constructed to perform the tasks of partitioning image frames into regions, classifying the regions as featureless or feature-rich, extracting features, and matching those features to geo-registered database features, respectively.

In another example, each of the partitioner, classifier, warper, feature extractor, and feature matcher may be implemented in the form of sets of computer instructions stored in non-transitory computer-readable media that, when executed by one or more computer processor(s), cause the processor(s) to perform the processing tasks of partitioning image frames into regions, classifying the regions as featureless or feature-rich, extracting features, and matching those features to geo-registered database features, respectively.

Multiple processors, or one or more multi-core processors, may be used. In some instances, the parallel processing tasks are performed in independent software threads as carried out by the multiple cores or processors. Consequently, the computationally expensive steps of perspective warping and feature extraction may be distributed over all available processors or processing cores.

In some instances, the tasks of the various components, including partitioner, classifier, warper, feature extractor, and feature matcher are carried out on a graphical processing unit (GPU).

One of ordinary skill in the art will recognize that a computer or another machine with instructions to implement the functionality described herein is not a general purpose computer. Instead, the machine is adapted to implement the described functionality.

Alternatively or in addition to implementation using computer processors, the processing functionality may be implemented using dedicated image processing circuitry, or, for example, field-programmable gate arrays (FPGAs).

In practice, vision-aided updates to the navigation solution 13 should be provided at least on the order of between once every minute to once every half-hour. Such updates are not possible during long periods of flight out of sight of landmark features, as when an aerial vehicle flies over an ocean out of sight of shore. In the case where an aerial vehicle returns to a shoreline after a lengthy period of flying over water, a pattern recognition method can be used to register an acquired image to a general area of the map database, so that the navigation system can know roughly where it is. Then, using the vision-aided navigation described above, the system can lock on to the particular location.

This hierarchical position determination is more efficient than attempting to ascertain a fine-resolution position without knowledge of coarse-resolution position. The following example illustrates the use of such a hierarchical determination. Suppose an aerial vehicle has been flying over the ocean for several hours under GNSS-denied conditions. The vehicle's IMU-based determination of position may have drifted considerably during that time such that the distance error provided in covariances feedback 76 to vision-based geo-registration system 48 is too large to be useful to feature matcher 54 in narrowing its search range. For example, the distance error represented by the covariance data may be on the order of thousands or tens of thousands of miles, but it may be computationally impractical to search all map database imagery for all of the approximately 200 million square miles of surface area of the Earth in order to match observed features to database features and calculate, estimate, or predict the aerial vehicle's location. As such, geo-registration system 48 may be provided with coarse map data, for example, of the globe partitioned into 10,000 regions. Upon the aerial vehicle's return to shore, using a pattern recognition method, an aerial image frame may be matched to one of the coarser globe regions. The machine learning technique described above, for example, may be employed to provide the requisite pattern matching. Pattern matching may also, for example, be based on or more of a generalized Fourier transform, Bayesian sequential hypothesis testing, artificial neural networks, and/or genetic algorithms. Applying the coarse pattern recognition method to match the acquired image frame to one of the coarser globe regions effectively narrows the search area in the same way that the navigation covariances feedback 76 would have been able to do had the distance error not been so large. With the search area narrowed, the feature matcher 54 can more efficiently commence to match finer image regions and thus to more narrowly determine the position of the aerial vehicle. The hierarchical method in essence first reduces the distance error provided to the vision-based geo-registration system 48 so as not to overburden its feature matcher 54.

Figure 10:
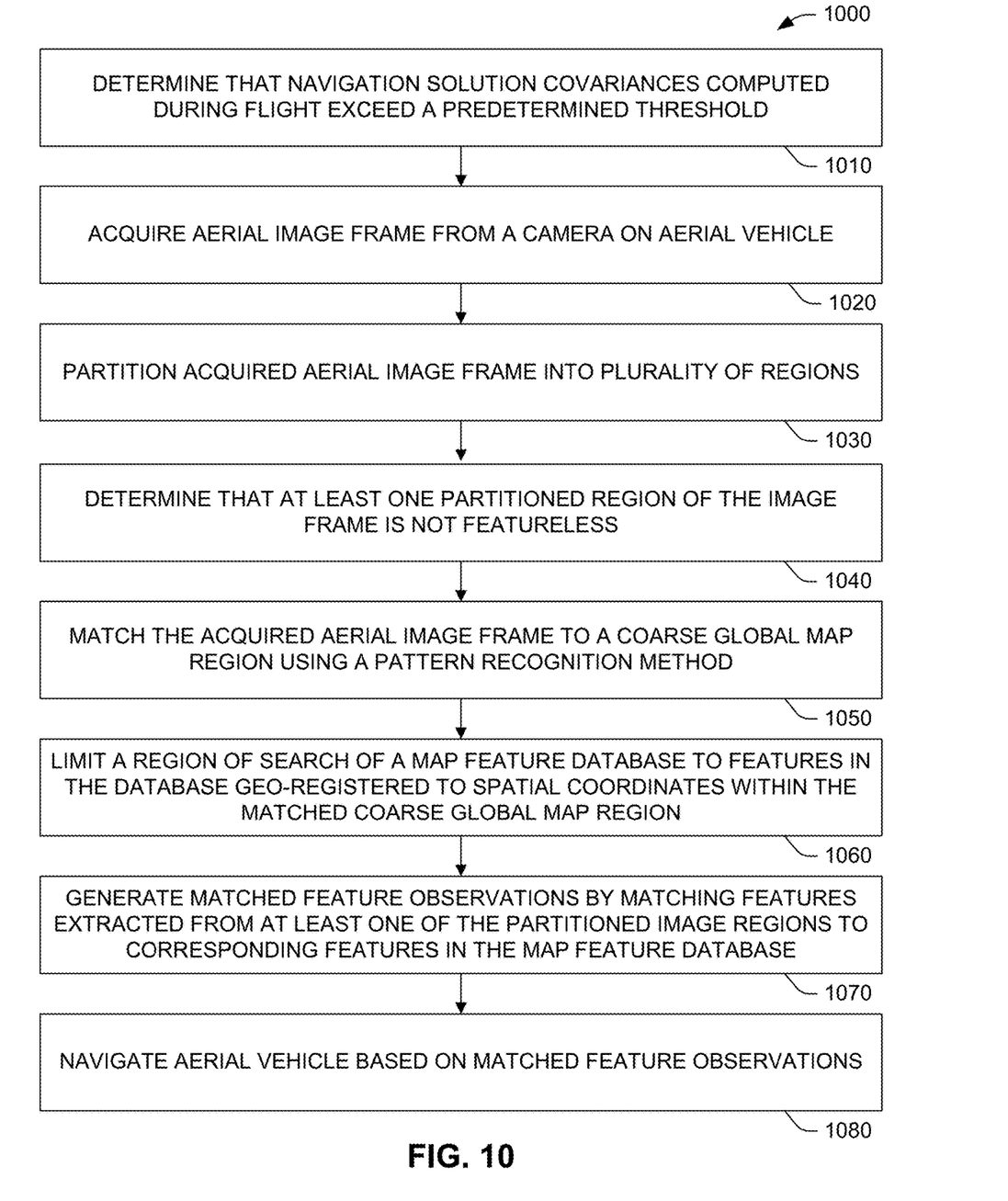
FIG. 10 is a flow chart illustrating an aerial vehicle navigation method using a hierarchical position determination that proceeds from a coarse position determination to a fine position determination.

An example method 1000 of the above-described hierarchical position determination is illustrated in the flow chart of FIG. 10. Since the pattern recognition-based coarse region determination need only be employed when covariances 76 are large, an initial first step 1010 to the method is determining that navigation solution covariances computed during flight exceed a predetermined threshold. The threshold may be indicative of, for example, a distance error of 5,000 miles, or, for another example, 10,000 miles. The threshold may also be empirically or adaptively adjusted if an initial threshold fails to provide the intended computational savings associated with narrowing of the database search. Where the covariances exceed the threshold, the coarse region matching and coarse position determination is made first, in order to better limit the database search for the fine region matching and find position determination. If the covariances do not exceed the threshold, no coarse determination is necessary and the system proceeds to a fine position determination as described in the methods illustrated in either of FIG. 8 or 9.

Thus there is provided a method of navigating an aerial vehicle 1000 comprising determining that navigation solution covariances computed during the flight of the aerial vehicle exceed a predetermined threshold 1010, acquiring an aerial image frame from a camera on the aerial vehicle 1020, partitioning the acquired aerial image frame into regions 1030, determining that at least one partitioned region of the image frame is not featureless 1040, matching the acquired aerial image frame to a coarse global map region using a pattern recognition method 1050, limiting a region of search of a map feature database to features in the database geo-registered to spatial coordinates within the matched coarse global map region 1060, generating matched feature observations by matching features extracted from at least one of the partitioned image regions to corresponding features in the map feature database 1070, and navigating the aerial vehicle based at least in part on the matched feature observations 1080. The coarse global map region may, for example, consist of an area of the globe divided into 10,000 equally sized areas. It is understood that the above method is compatible with, and may be combined with, the above-described methods illustrated in FIGS. 8 and 9.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A hierarchical position determination based method of navigation of an aerial vehicle, the method comprising:
   determining that the navigation solution covariances computed during flight exceed a predetermined distance threshold;
   acquiring an aerial image frame from a camera on the aerial vehicle;
   partitioning the acquired aerial image frame into a plurality of regions;
   determining that at least one partitioned region of the image frame is not featureless;
   matching the acquired aerial image frame to a coarse global map region using a pattern recognition method;
   limiting a region of search of a map feature database to features in the database geo-registered to spatial coordinates within the matched coarse global map region;
   generating matched feature observations by matching features extracted from at least one of the partitioned image regions to corresponding features in the map feature database;
   navigating the aerial vehicle based at least in part on the matched feature observations.

2. The method of claim 1, wherein the generating matched feature observations comprises:
   classifying one or more of the plurality of regions as featureless or feature-rich by:
      computing an autocorrelation function to determine at least one peak width, and testing the at least one peak width against a width threshold, and/or by
      using a model that has been trained using a machine learning method applied to a training dataset comprising a plurality of training images of featureless regions and a plurality of training images of feature-rich regions;
   extracting features for those regions classified as feature-rich and not for those regions classified as featureless.

3. The method of claim 2, wherein the classifying of the regions is conducted in parallel, with each region classified in an independent software thread.

4. The method of claim 2, wherein the generating matched feature observations further comprises matching features following the extracting features, wherein matched feature observations are generated by matching features extracted from the regions to corresponding features in a map feature database.

5. The method of claim 4, further comprising performing data fusion following the matching features and prior to the navigating the aerial vehicle, wherein the matched feature observations are combined with inertial measurement unit (IMU) sensor readings using a Kalman filter to arrive at a corrected navigation solution suitable for input into an inertial navigation system (INS).

6. The method of claim 5, wherein the Kalman filter fuses readings from a barometric sensor in addition to the matched feature observations and the IMU sensor readings to arrive at the corrected navigation solution.

7. The method of claim 2, further comprising performing perspective warping following the classifying and prior to the extracting features, wherein the perspective of a region is ortho-rectified.

8. The method of claim 2, wherein one or more of the plurality of regions is classified as featureless or feature-rich by computing the autocorrelation function to determine the at least one peak width, and by testing the at least one peak width against the width threshold, wherein the width threshold is dynamically computed as an Otsu threshold statistically derived from a set of peak widths determined from the plurality of regions, the set of peak widths having a bimodal distribution.

9. The method of claim 1, wherein the partitioning the acquired aerial image frame comprises partitioning the acquired aerial image frame into regions using a watershed segmentation method.

10. The method of claim 1, wherein the partitioning the acquired aerial image frame comprises partitioning the acquired aerial image frame into regions using a grid partition method.

11. The method of claim 1, wherein the size of the coarse global map region to which the acquired aerial image frame is matched is smaller than the globe surface area of each of the partitioned acquired aerial image frame regions.

12. The method of claim 1, wherein the area of the coarse global map region to which the acquired aerial image frame is matched corresponds to one ten-thousandth of the globe or larger.

13. The method of claim 1, wherein the distance threshold is on the order of thousands of miles.

14. The method of claim 1, wherein the pattern recognition method is based on or more of:
a generalized Fourier transform,
Bayesian sequential hypothesis testing,
artificial neural networks, and/or
genetic algorithms.

15. A system for navigation of an aerial vehicle using hierarchical position determination, the system comprising:
a camera configured to acquire an aerial image frame;
a fusion engine configured to provide navigation solution covariances indicative of accumulated error in a determination of the position of the aerial vehicle during GNSS-denied flight;
an image processor comprising:
a partitioner configured to partition an acquired aerial image frame into a plurality of regions;
a classifier configured to classify each one of the regions as only one of featureless or feature-rich;
a pattern recognizer configured to match the acquired aerial image frame to a coarse global map region using a pattern recognition method based on determining that:
at least one partitioned region of the image frame is not featureless, and
the navigation solution covariances computed during flight exceed a predetermined distance threshold; and
a feature matcher configured to generate matched feature observations by matching features extracted from at least one of the partitioned image regions classified as feature-rich to corresponding features in one or more selected search regions of a map feature database having a number of search regions, wherein the one or more selected search regions of the map feature database are limited to those geo-registered to spatial coordinates within the matched coarse global map region; and
navigation controls configured to navigate the aerial vehicle based at least in part on the matched feature observations.

16. The system of claim 15, wherein the classifier is configured to classify the one or more of the plurality of regions as featureless or feature-rich by computing an auto-correlation function to determine at least one peak width, and testing the at least one peak width against a width threshold.

17. The system of claim 15, wherein the classifier is configured to classify the one or more of the plurality of regions as featureless or feature-rich by using a model that has been trained using a machine learning method applied to a training dataset comprising a plurality of training images of featureless regions and a plurality of training images of feature-rich regions.

18. The system of claim 15, wherein the size of the coarse global map region to which the acquired aerial image frame is matched is smaller than the globe surface area of each of the partitioned acquired aerial image frame regions.

19. The system of claim 15, wherein the area of the coarse global map region to which the acquired aerial image frame is matched corresponds to one ten-thousandth of the globe or larger.

20. The system of claim 15, wherein the distance threshold is on the order of thousands of miles.

* * * * *